Dec. 20, 1955   T. J. DOSSIE ET AL   2,727,314
COMBINATION SPIRIT LEVEL AND PLUMB
Filed Dec. 9, 1952
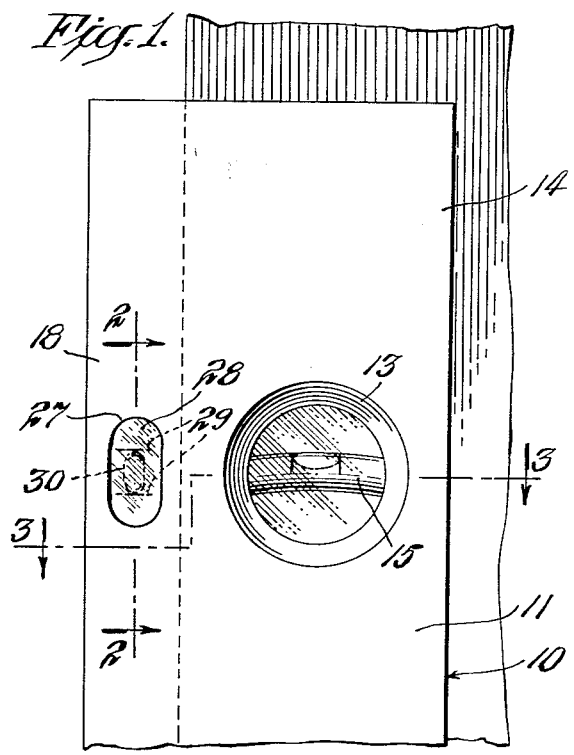
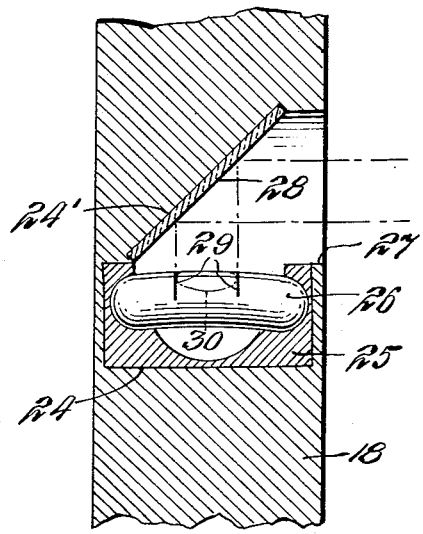
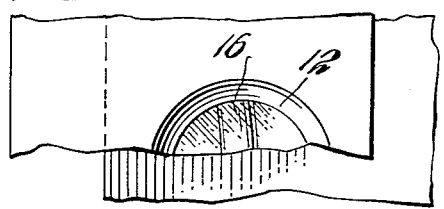
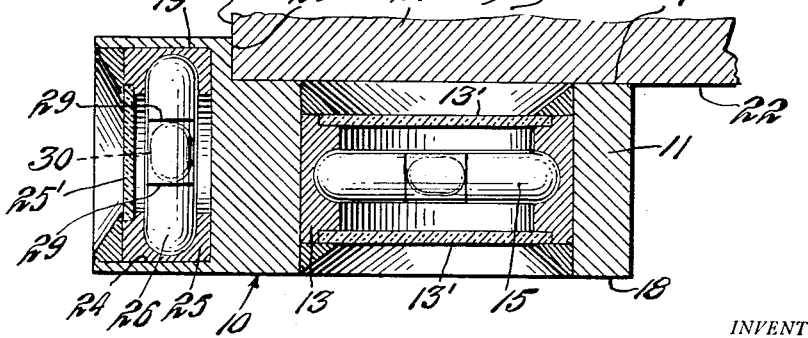
INVENTORS
*Thomas J. Dossie*
*Max J. Parnes*
BY *Howard F. Thompson*
ATTORNEY

United States Patent Office 2,727,314
Patented Dec. 20, 1955

2,727,314

COMBINATION SPIRIT LEVEL AND PLUMB

Thomas J. Dossie, New York, and Max J. Parnes, Brooklyn, N. Y.

Application December 9, 1952, Serial No. 324,912

1 Claim. (Cl. 33—211)

This invention relates to spirit levels and plumb devices utilized in gauging horizontal, vertical and other surfaces. More particularly, the invention deals with a tool of the character described having angularly disposed edges portions for engaging angularly disposed surfaces of a workpiece and in providing two associated spirit level devices, one of which is readable through an inclined mirror so as to simultaneously gauge the angular surfaces, particularly in lining up a vertical column or riser in rendering the same plumb in both directions.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of one end portion and part of the central portion of a spirit level made according to our invention, with parts of the construction broken away, Fig. 2 is a partial enlarged section on the line 2—2 of Fig. 1, with part of the construction shown in elevation; and Fig. 3 is an enlarged section on the line 3—3 of Fig. 1, with parts of the structure shown in elevation.

In illustrating one adaptation and use of our invention, we have shown at 10 a spirit level and plumb device, comprising a main elongated body 11 having centrally thereof a conventional spirit device shown in part at 12 for use in gauging level surfaces and, at 13, we have shown another spirit device arranged at one end portion 14 of the body 11, the slightly rounded spirit tube 15 of the device 13 being arranged transversely or, in other words, at right angles to the spirit tube 16 of the device 12. These structures are quite common in devices of the kind under consideration and, as known, the opposite end portion of the body 11 has another spirit device, similar to the device 13, but this is not shown, as it would simply be a duplicate of the first named end portion 14.

The body portion 11 of standard tools of the kind under consideration is usually bordered by parallel edges and parallel side surfaces as, for example, the surfaces 17 and 18, note Fig. 3. In the present construction, we provide a slightly wider body portion 11 and form, on the surface 17 at one side of the body 11, an extension 19 which may be termed a narrow rib or flange and this rib or flange has a surface 20 disposed at right angles to the surface 17. It will thus be apparent that the device 10 can be mounted on a workpiece 21, so as to rest flatly on the angular surfaces 22 and 23 thereof, as clearly noted in Fig. 3 of the drawing.

The body 11 is recessed at one side of the spirit 13, as seen at 24, note Figs. 2 and 3, and in the lower portion of this recess is arranged a spirit device 25, the spirit tube 26 of which is in a horizontal plane like the tube 15, but is disposed below and at right angles to the tube 15, as will clearly appear from a consideration of Fig. 3 of the drawing. The recess 24 includes an upwardly directed angular extension 24′, note Fig. 2, which opens outwardly through the surface 18 of the body 11, as seen at 27, this opening being preferably elliptical, as noted in Fig. 1 and arranged in transverse alinement with the spirit tube 15. On the angular surface 24′ is secured a mirror 28, which is at an angle of 45° to the tube 26 and the opening 27, thus the gauge markings 29 on the tube 26 will be reflected onto the mirror and visible through the opening 27 in alinement with the tube 15, as clearly illustrated in Fig. 1 and, in like manner, the bubble 30 of the spirit tube 26 will also be readable on the mirror 28, again as visualized in Fig. 1. It will be noted that the portion of the spirit device 25, as well as the tube 26, is arranged within the body 11.

By reason of the construction shown, it will be apparent that, with one vision at the surface 18 of the tool, readings can be taken to gauge the surfaces 22 and 23 simultaneously. In other words, in fixing a two by four or other column in position, or gauging the setting thereof, this operation can be accomplished from a single reading of the tool 10. By reason of this single reading, considerable time will be saved in construction work of various types and kinds.

The above illustration with reference to what is known as a piece of lumber is only by way of illustrating one of the many uses of a tool of the kind under consideration.

It will be understood that the combination at the end portion 14 of the tool can be reproduced at the opposed end thereof and combination of duplicate associated levels can be utilized on other parts of tools of the kind under consideration, the purpose of which will be to simultaneously gauge relationship of two surfaces or a single surface in two directions.

Spirit devices of the kind under consideration usually employ protective windows or transparencies and the device 13 is shown with two of such windows or transparencies at 13′ in Fig. 3 of the drawing; whereas the device 25 has a single window or transparency 25′. Aside from this detail, the other structure of the spirit devices and the method of their mounting is not described in detail, as this forms no part of the present invention and these mountings vary in tools of different types and kinds. In this connection, it will be understood that a wood or similar solid body structure is shown in the accompanying drawing. However, spirit level and plumb devices are made in different manners utilizing metal, plastics or combinations thereof.

It will be apparent that instruments of the type and kind under consideration have the conventional parallel side surfaces and side edges for varied uses of the instrument and the projecting side portion adds to these normal surfaces the angular surface arranged at right angles to one of the side surfaces of the instrument, whereby the simultaneous readings of the plumb of an object, that is to say, angular surfaces of an object can be performed.

Further, it will be apparent that the spirit device 25, includes its mirror or reflecting surface 28, and the opening 27 formed in the instrument at right angles to the spirit tube 26 and at 45° to the reflector surface forms what may be termed a spirit unit, which provides for reading of the spirit tube or level at a surface of the instrument at right angles to the normal reading surface of said spirit device.

Having fully described our invention, what we claim as new and desire to secure by Letters Patent is:

An instrument of the character described, comprising an elongated body having straight and parallel edges and side surfaces, one side portion of the body having a longitudinal projection in the form of a narrow flange, said flange including a narrow elongated surface disposed at right angles to one of said side surfaces, the body having, centrally thereof, a spirit device for gauging level surfaces, one end of the body having a spirit device for use in gauging the plumb of one surface of an object, the last named spirit device having a spirit tube disposed at right angles to the spirit tube of the first named device, the side portion of the body having the flange, including a third spirit device, the major portion of which is arranged in said body at one side of and in close proximity to and below the second named spirit device, the third spirit device having a spirit tube arranged at right angles to the spirit tube of said second device and crossing a plane extending along the longitudinal axis of said second device, the first and second named spirit devices being readable through opposed side surfaces of said body, the third spirit device being readable through one side edge surface of the body, the body, adjacent said edge surface, having an opening extending through the side surface of the body, and means in said opening and said body in transverse alinement with said second named spirit device for reflecting the spirit tube of the third spirit device for visibility through said opening in transverse alinement with the second named spirit tube.

References Cited in the file of this patent

UNITED STATES PATENTS

| | | |
|---|---|---|
| 1,256,737 | Small | Feb. 19, 1918 |
| 1,599,048 | Hansen | Sept. 7, 1926 |
| 1,691,776 | Mayes | Nov. 13, 1928 |
| 1,741,422 | Kuker | Dec. 31, 1929 |
| 2,143,080 | McDonald | Jan. 10, 1939 |
| 2,231,036 | Suverkrop | Feb. 11, 1941 |
| 2,466,829 | Sprinkel | Apr. 12, 1949 |
| 2,620,571 | Varian | Dec. 9, 1952 |